United States Patent [19]

Chollet et al.

[11] Patent Number: 4,912,406
[45] Date of Patent: Mar. 27, 1990

[54] DEVICE FOR DETERMINING POSITION OF A RAILWAY VEHICLE BY MEASURING DEVIATION IN POSITION OF A MAGNET

[75] Inventors: Hugues Chollet; Jean-Louis Maupu, both of Arceuil; Jean-Michel Petit, Le Pre Saint Gervais, all of France

[73] Assignees: Alsthom; Regie Autonome des Transports Parisiens, both of Paris; Institut National de Recherche sur les Transports et leur Securite, Arceuil Cedex, all of France

[21] Appl. No.: 250,808
[22] Filed: Sep. 28, 1988

[30] Foreign Application Priority Data

Sep. 28, 1987 [FR] France .................................. 87 13380

[51] Int. Cl.⁴ .......................... G01B 7/14; G01B 7/30; G01P 13/00; B61L 13/04
[52] U.S. Cl. .................................. 324/207.23; 73/519; 246/249; 324/207.13; 335/205; 340/870.33
[58] Field of Search .................. 324/207, 208; 33/364, 33/DIG. 1; 246/247, 249; 361/179, 180; 200/52 R, 52 A, 61.45 R, 61.45 M, 61.52; 335/205; 73/516 R, 517 R, 517 A, 518, 519; 340/669, 870.33

[56] References Cited

U.S. PATENT DOCUMENTS

| | | | |
|---|---|---|---|
| 2,749,663 | 6/1956 | Lemelson | 324/259 X |
| 4,484,041 | 11/1984 | Andres et al. | 200/61.45 M |
| 4,646,011 | 2/1987 | Wallrafen | 324/208 |
| 4,717,873 | 1/1988 | Carr, Jr. et al. | 324/207 |
| 4,726,627 | 2/1988 | Frait et al. | 200/61.45 M |
| 4,803,426 | 2/1989 | Odagawa et al. | 324/207 |
| 4,820,888 | 4/1989 | Shields | 335/205 X |

FOREIGN PATENT DOCUMENTS 57-173701 10/1982 Japan .

Primary Examiner—Gerard R. Strecker
Attorney, Agent, or Firm—Sughrue, Mion, Zinn, Macpeak & Seas

[57] ABSTRACT

Apparatus including a magnet (10) having at least one degree of freedom with respect to a first member, tangent to the direction of measurement and cooperating with a magnetic portion associated with a second member, and a sensor (11) for picking up the position of the magnet relative to the first member. Such apparatus is employed in steerable railway vehicles.

7 Claims, 2 Drawing Sheets

DEVICE FOR DETERMINING POSITION OF A RAILWAY VEHICLE BY MEASURING DEVIATION IN POSITION OF A MAGNET

BACKGROUND OF THE INVENTION

This invention concerns an apparatus for noncontact measurement of the position of a first member in relation to a second, ferromagnetic member in a direction tangent to the surface separating them, through said surface and independently of variations in position in a direction normal to said surface.

In particular, the first member is linked to a railway vehicle axle and the second member is one of the rails of the track on which the wheelset of this axle is running, the measurement being transverse to the axis of the track. It is notable that in this case, due to track intersections and turnouts, switch gear, grade crossings and the like, it is difficult to place a sensor below the plane of the running surface and that high speed travel requires a noncontacting sensor.

With a pair of these apparatus, in front of and behind a wheel of the axle, data can be had about the transverse and angular position of the axle in relation to the track, making it possible to make steerable trucks, ie. trucks (bogies) with steerable axle sets.

SUMMARY OF THE INVENTION

An object of the invention is to provide a simple and rugged position measuring apparatus able to withstand the ceaseless vibrations and shocks to which a railroad axle is subjected and to gain independence from the vertical variations (wheel wear, axle pitching, suspended gear).

In accordance with the invention, the first member comprises a sealed box, fixed to the axle, and with a purely vertical suspension, if any, within which a magnet can move in the direction of measurement. The magnet's motion is either linear or rotative to a small angle and in this case its axis of motion is preferably located on the average in the plane of symmetry of the rail.

The magnet and the second member, ie. the rail, form a magnetic circuit with variable reluctance. The forces of interaction between the magnet and the rail maintain these two elements stably in a given transverse position (the position of minimum reluctance), independent of the vertical position. The relative position of the magnet in relation to the sealed box is then measured by a conventional sensor. The sensor is preferably a synchro resolver. In the case of a rotative motion, the resolver measures the angle of rotation of the magnet support shaft. The latter rotation is preferably about a vertical axis.

BRIEF DESCRIPTION OF THE DRAWINGS

The invention and its advantages will be more readily understood with the help of the following description of two preferred embodiments thereof, taken with reference to the appended drawings in which.

DESCRIPTION OF THE PREFERRED EMBODIMENTS

Figure 1:
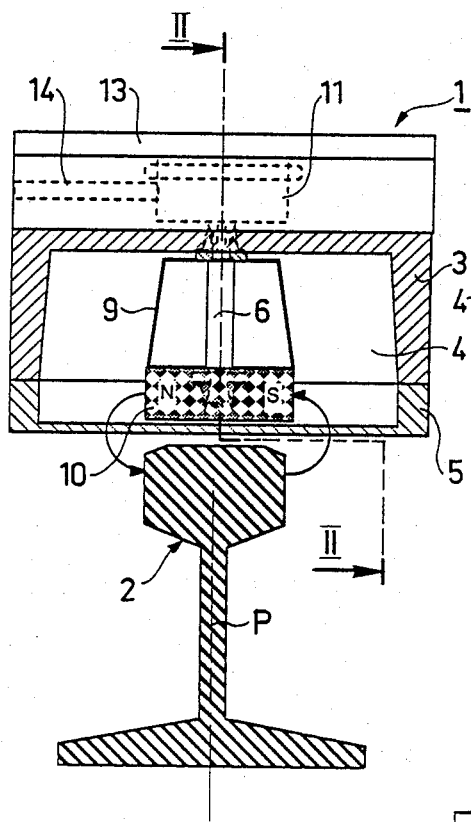
FIG. 1 is an elevation of a cross section of the apparatus according to a first embodiment of the invention, taken along line 1—1 of FIG. 2.

The embodiment that will now be described relates to an apparatus for measuring the position of an axle in relation to the running track.

In all the figures, the numeral 1 designates the measuring apparatus as a whole, which is attached to an axle omitted from the drawings, and arranged so that it remains close to a rail 2 on which the wheelset rolls.

The inventive apparatus includes a housing 3 made of a non-magnetic material, bounding a chamber 4 closed by a plate 5 of the same material.

A shaft 6 can pivot in two bearings 7 and 8, consisting for example of needle bearings or of polytetrafluoroethylene (registered trademark TEFLON).

The housing is attached to the axle such that the shaft 6 is on the average in the vertical median plane P of longitudinal symmetry of the rail 2.

The shaft carries a folded sheet 9 of non-magnetic metal (stain-less steel, for example), to which is fitted a permanent magnet 10.

The direction of magnetization of the magnet can be perpendicular to the aforementioned vertical median plane of symmetry P.

The magnet is preferably a samarium-cobalt rectangular bar magnet.

The plate 5 is provided with an arcuate groove within the upper surface thereof defining a thinned portion 5A allowing the magnet to be located close to the rail and so that the magnetic circuit formed by the magnet 10 and the rail 2 will have a relatively low reluctance to increase the magnetic coupling between the magnet and the rail.

The magnet is urged to stay in the same transverse position with respect to the rail centered with the median plane P of the rail. Thus, any transverse motion of the housing 3 relative to the rail 2 causes the shaft 6 to rotate since the magnet 10 remains centered transversely across the rail 2.

Measurement of the rotation of the shaft 6 provides a measure of a degree of freedom of the axle. Two apparatus of this type, placed respectively fore and aft of the axle, supply its angular position and its transverse position in relation to the rail.

The measuring means can be of any type, but it is advantageous to use a synchro resolver 11, which can be placed in a cavity in the top part of the housing and fitted with an O-ring 12 sealing it off from external agents.

The cavity is closed by a cover 13.

A passage 14 in the housing allows placement of the electric wires for connecting the synchro resolver.

Attention is drawn to the fact that whenever the magnet 10 moves, the metal plate 5 is the seat of eddy currents which have the effect of damping the magnet's motion.

The apparatus thus exhibits little sensitivity to the multiple shocks and vibrations generated by a wheelset moving along a rail.

The sensor according to the invention is rugged and sufficiently accurate to enable a signal to be generated that is usable in an axle steering control circuit.

Figure 4:
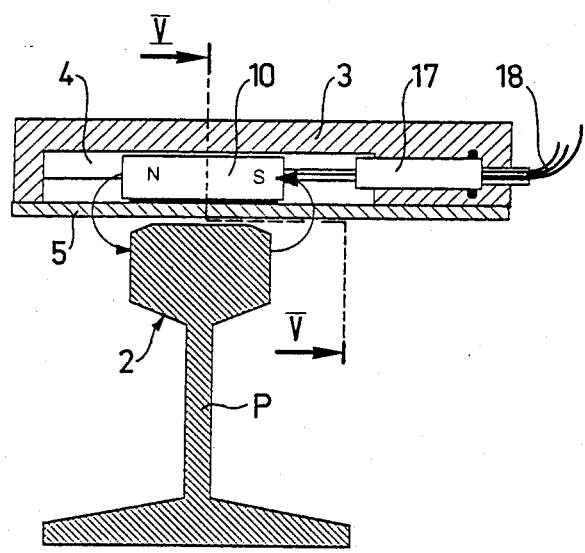
FIG. 4 is an elevation of a cross section of a second embodiment
Figure 5:
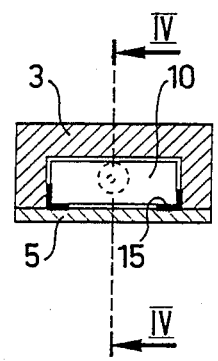
FIG. 5 is a sectional view of the same apparatus as in FIG. 4, taken along line V—V of that figure.
Figure 6:
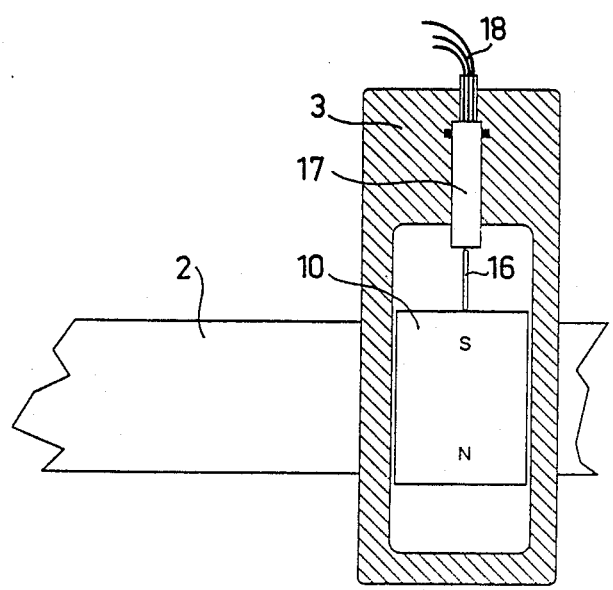
FIG. 6 is a top view, partly cut away, of the same apparatus.

FIGS. 4 through 6 illustrate an alternative embodiment of the apparatus according to the invention in which the magnet is constrained to translational movement within the housing.

In the drawings, the features common to both embodiments bear the same reference numerals in both sets of figures.

The magnet 10 is controlled to move only in translation within the housing 3–5; a plastic coating 15 on the inside of the box smooths the magnet's sliding.

The best sensitivity is obtained by arranging the magnet so that its direction of magnetization, and hence of displacement, is substantially in a horizontal plane, perpendicular to the rail.

The magnet's movement is measured electrically by fitting the magnet with a rod 16 in fixed relation therewith and being part of a capacitive or inductive linear motion sensor 17 placed in a cavity of the housing and equipped with output leads 18.

Figure 2:
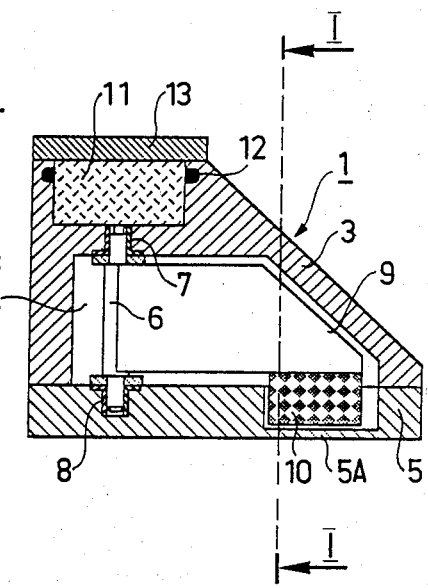
FIG. 2 is a cross-sectional view of the same apparatus, taken along line 11—11 of FIG. 1.
Figure 3:
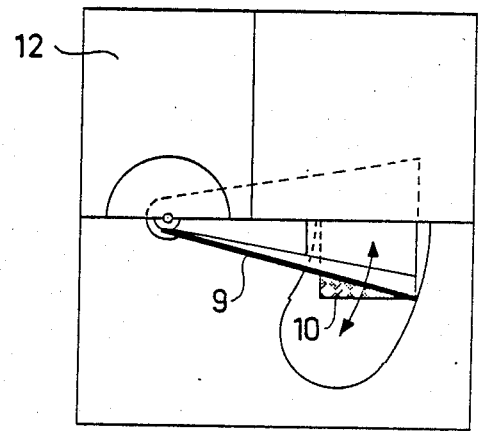
FIG. 3 is a top view, partly cut away, of the same apparatus.

This embodiment affords the same advantages as the apparatus described with reference to FIGS. 1 through 3.

We claim:

1. Apparatus for noncontact measurement of the position of a railway vehicle moving in a direction defined by at least one rail supporting said vehicle for travel thereon, said apparatus comprising a housing fixed to said vehicle and overlying said rail, a magnet in said housing having at least one degree of freedom with respect to the housing in a direction transverse to the vertical median plane P of said at least one rail and positioned in proximity of a magnetic portion of said at least one rail, with the direction of magnetization of the magnet substantially transverse to the vertical median plane P, and measuring means carried by the railway vehicle for measuring a deviation in the position of the magnet in relation to said housing correlated to the transverse shift in position of said railway vehicle relative to the median plane P of said rail.

2. The apparatus of claim 1, wherein the magnet is installed fast with a shaft within said housing rotating about an axis parallel to said vertical median plane of said rail, and said measuring means is an angular-position sensor.

3. Apparatus according to claim 2, wherein said shaft, said magnet and said measuring means are disposed within a sealed box attached to the railway vehicle, said sealed box comprising said housing.

4. Apparatus according to claim 3, wherein said measuring means is a synchro resolver.

5. The apparatus of claim 1, wherein the magnet is constrained to move only in lateral translation in relation to the housing, and said measuring means is a linear-motion sensor.

6. Apparatus according to claim 1, wherein the magnet is movably supported by said housing on an axle of a wheelset of said railway vehicle, and said at least one rail is one of plural rails of the wheelset's running track.

7. The apparatus according to claim 1, wherein said housing includes a non-magnetic material plate in proximity with and overlying said rail, said plate being provided with an arcuate groove within the upper surface thereof defining a thin portion, said permanent magnet is located within said groove, means carried by said housing for supporting said permanent magnet for arcuate movement in the direction of magnetization of said magnet within said arcuate groove tangent to the direction transverse to the vertical median plane of said at least one rail such that said magnet and said rail define a relatively low reluctance magnetic coupling therebetween.

* * * * *